Patented July 29, 1952

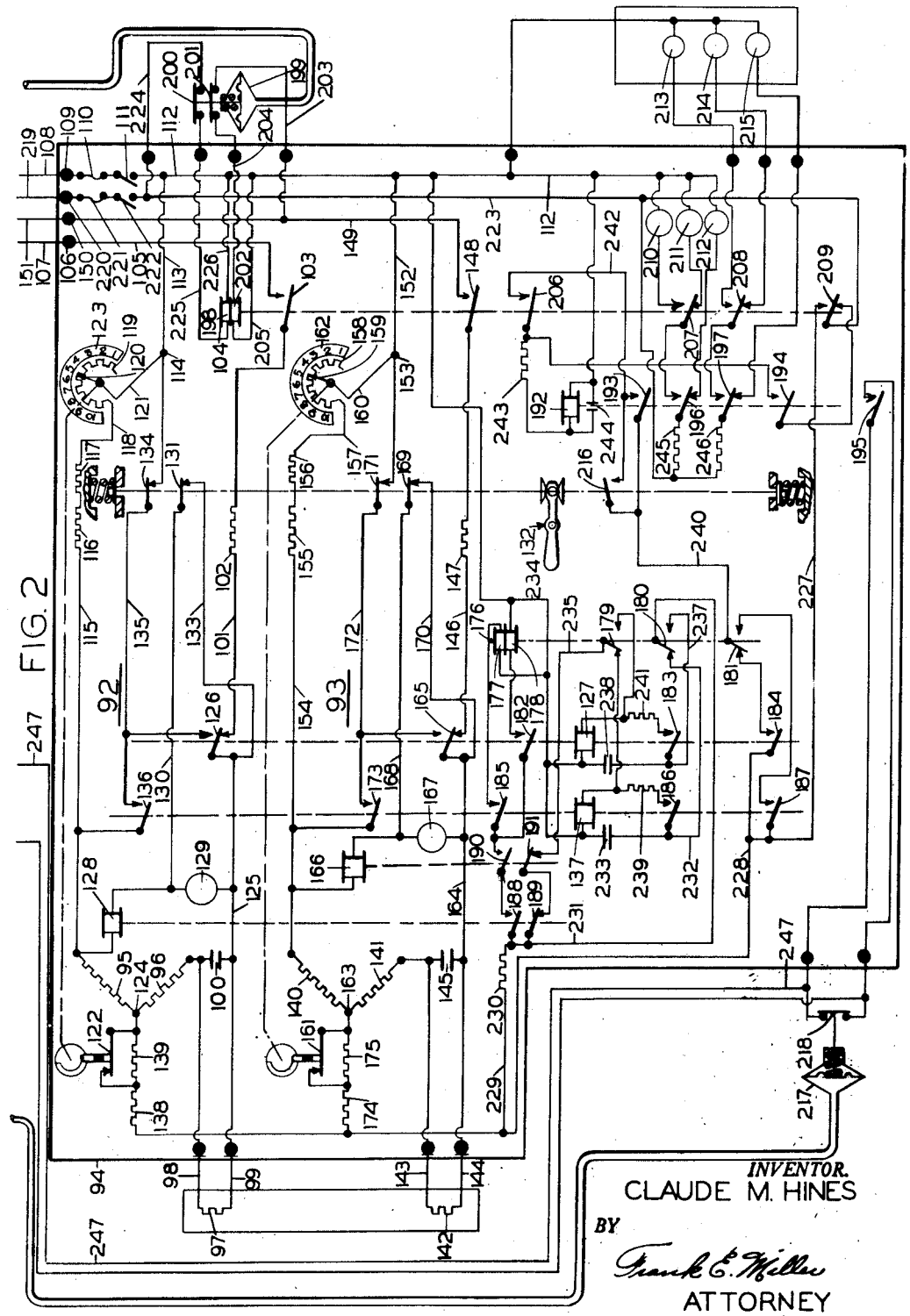

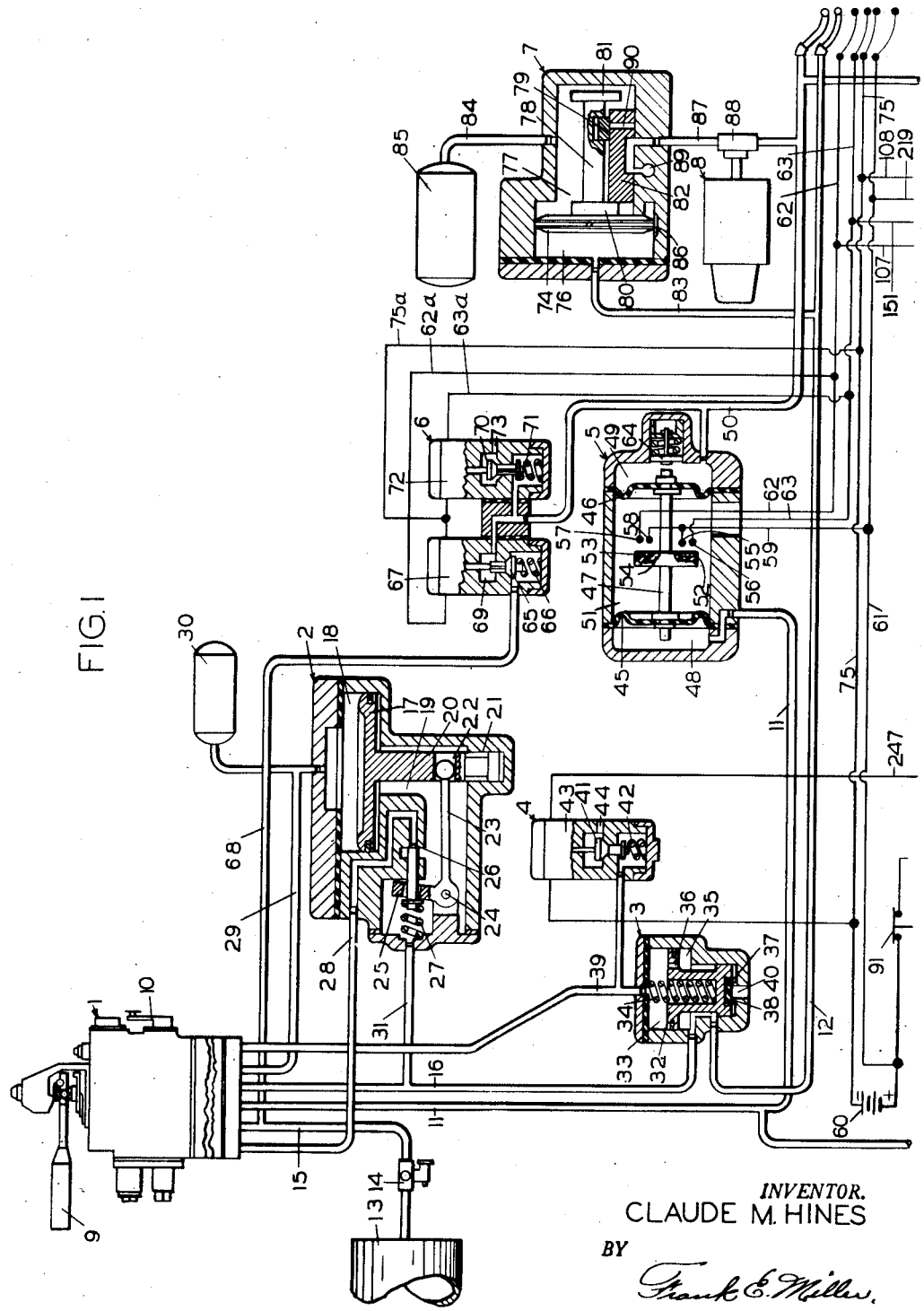

2,605,329

UNITED STATES PATENT OFFICE 2,605,329

APPARATUS FOR CHECKING THE INTEGRITY OF ELECTRIC CIRCUITS

Claude M. Hines, Verona, Pa., assignor to Westinghouse Air Brake Company, a corporation of Pennsylvania Application May 5, 1948, Serial No. 25,208

14 Claims. (Cl. 177—311)

This invention relates to a circuit checking means, and more particularly, to an apparatus adapted to be associated with train wire control circuits of electro-pneumatic brake systems on railway trains for automatically signalling the integrity or lack of integrity of the train wire circuits and windings of electrical devices associated therewith.

Most high speed trains of today are equipped with a combination of two brake control systems, either of which is alternately and independently operative of the other. Such brake control equipments usually include an electropneumatically controlled straight-air brake system and a wholly pneumatically controlled automatic brake system, each of which is controlled by a single control lever on a single brake control valve device. A brake control apparatus of this type is illustrated and described in Patent No. 2,106,483 issued to E. E. Hewitt, January 25, 1938.

The automatic brake system is characterized by a normally charged control pipe, commonly known as the brake pipe, extending from one end of the train to the other with a branch pipe leading from the brake pipe to a brake control valve device on each car of the train. Selected variations of the fluid pressure in this brake pipe causes operation of the brake control valve device on each car to effect either a brake application or brake release as desired. The variation of fluid pressure in the brake pipe travels by wave action, at a speed somewhat less than that of sound in air, from the point of origin, usually the locomotive, to all other parts of the train. This wave action is effective to produce a serial action of the brake control valve units on the cars for sequentially applying or releasing the brakes on successive cars of a train. This serial brake action results in a slack action between the cars of the train attended in some instances by shock to the cars, and in the case of passenger trains, discomfort to the passengers.

The electro-pneumatically controlled straight-air brake control system, making use of electric current to control the brake operation, produces practically simultaneous and uniform control of the brakes on all cars. The simultaneous and uniform action of the brakes as a result of instantaneous transmission of the electrical control impulses throughout the train, minimizes the slack action between the cars and produces faster and heavier applications of the brakes, thereby enabling shorter stopping distances than may be obtained with the automatic brake control system.

For convenience, the electro-pneumatic straight-air brake control system will hereinafter be referred to as the straight-air brake system and the wholly pneumatically controlled brake system will be referred to as the automatic brake system.

Because of the advantages inherent in the straight-air brake system over the automatic brake ssytem, the straight-air brake system is customarily employed in preference to the latter system. The automatic brake system thus serves as an alternate brake system to be used in most instances in the event of failure or a faulty condition of the straight-air brake system.

The present straight-air brake systems employ control wires or circuits which extend from the locomotive or control car at the head end of the train through all cars in the train, suitable electric couplers being provided between the cars for serially connecting each corresponding car wire into one continuous conductor through the train. By reason of the flying ballast and water, attendant upon a fast moving train, and the lost motion between the individual cars, the electric couplers are vulnerable to faults, such as open circuits, shorted or grounded circuits which may cause failure of the straight-air brake system to function either partially or even completely. If the nature and location of the fault can be determined, it is possible to correct the faulty condition and thus restore the straight-air brake system to its full serviceability without the loss of its utility.

The straight-air brake system usually includes two magnet valves, commonly referred to as the application magnet valve and the release magnet valve, on each car of the train. The release magnet valves are first operated, upon the initiation of a brake application, to close an atmospheric port from a pipe extending from car to car and throughout the train and commonly known as the straight-air pipe. The application magnet valves are next operated to admit fluid under pressure from a suitable source, to a straight-air pipe. The uniform fluid pressure thus established throughout the length of the straight-air pipe controls, either directly or indirectly, the fluid pressure established in the brake cylinders on all cars in the train and thereby causes a uniform degree of brake application to be simultaneously effected on all cars.

A failure of a small percentage of the application magnet valves to supply fluid under pressure to the straight-air pipe during a straight-air application of the brakes, reduces the rate of build-up of braking forces, but does not alter the degree of the application for the reason that the straight-air pipe is continuous and the operative application magnet valves are effective to establish the proper straight-air pipe pressure.

The failure of a small percentage of the release magnet valves to operate during a straight-air brake application to close their individual exhaust communications from the straight-air pipe to the atmosphere, is a matter of grave concern. In such cases, not only is the rate of development of the application retarded, but also the degree of application attainable is lowered and the available fluid under pressure from the source of supply, vital to the safe operation of the brake equipment, is concurrently released to the atmosphere. It is thus essential that the operator be made promptly aware of the faulty condition of the electro-pneumatic brake control equipment in order to avoid loss of fluid pressure supply. For safety reasons also it is undesirable to lose the time necessary to determine a faulty straight-air brake equipment by attempting a straight-air application before resorting to the automatic brake system.

The desirability of continuously indicating the integrity or lack of integrity of the electrical control circuits and of the magnet valve windings in the electro-pneumatic brake control systems has been previously recognized and several means and methods have been proposed and employed for this purpoe. I propose, however, to provide a novel apparatus, capable of detecting faults in the electrical control circuits, or in the windings of magnet valves associated therewith, in such a manner as to indicate not only the nature but also the location of any fault in the system.

It is accordingly an object of my invention to provide a novel apparatus for reliably indicating and signalling the integrity, or lack of integrity, of electrical control circuits.

A further object of my invention is to provide an apparatus, constructed on the Wheatstone bridge principle, adapted for use in conjunction with electro-pneumatic brake control systems of the type employed in railway train service, in a manner to identify which of a plurality of control circuits is faulty and also to indicate the nature and location of the fault.

Still another object of my invention is to provide an apparatus for checking the condition of electrical control circuits, which system is automatically disconnected from the control circuit at the time of a control operation to avoid interference by the checking system with the control operation and then automatically restored to function with the control circuit as soon as the control operation is completed.

Another object of my invention is to provide a circuit checking apparatus constructed in a compact portable form such that it may be conveniently installed and applied without difficulty to an electro-pneumatic train brake control system or to any other similar electrical control circuits for the purpose of checking the integrity or lack of integrity of the circuits.

Yet another object of my invention is to provide a circuit checking apparatus of the type indicated in the foregoing objects further characterized in that an application of the brakes by the automatic brake system is effected without delay, should the operator attempt a straight-air brake application when or while the control circuits are indicated as faulty.

The above objects, together with other objects which will be made apparent in the subsequent description of my invention, are attained by apparatus to be herinafter described when read in connection with the accompanying drawings, wherein Figs. 1 and 2, when taken together, constitute a diagrammatic view showing a simplified brake control equipment for railway cars and trains embodying my novel circuit checking and signalling system.

While a simplified brake control equipment is shown in the drawings for the purpose of illustrating the nature and utility of my novel circuit checking system, it will be understood that the apparatus illustrated and described herein may be applied to and function with various other types of control circuits.

The brake control equipment shown in Fig. 1 is that required for the locomotive or traction vehicle of a train, and may include a brake valve 1, an equalizing discharge valve device 2, a vent valve device 3, a magnet valve device 4, a master switch device 5, an application and release magnet valve device 6, an automatic brake control device 7 and a brake cylinder 8.

The brake valve device 1 is preferably the same as, or similar to, that described in Patent No. 2,106,483 to E. E. Hewitt, dated January 25, 1938. It is not essential to the understanding of the present invention that this brake valve device be either fully shown or described in detail, and for that reason, I have elected to refer only to those functions of the brake valve device essential to an understanding of the operation of the brake equipment illustrated.

The brake valve device 1 is preferably operated by movement of a handle 9, in a single application zone, to control all applications of the brake. In order to accomplish this, the brake valve is provided with a selector 10, which in one of its two positions, conditions the brake valve for straight-air brake operation, and which, in the other of its two positions, conditions the brake valve for automatic brake operation.

When the selector 10 is in the straight-air position, and the handle 9 is in release position, the straight-air control pipe 11 is in communication with the atmosphere, while the brake pipe 12 is being maintained charged from the main reservoir 13, under the control of a feed valve 14, by way of a feed valve pipe 15 and a branch pipe 16. A straight-air application of the brakes is effected by moving the handle 9 to any desired position into the application zone, whereupon communication between the control pipe 11 and the atmosphere is closed, and fluid under pressure is supplied to this control pipe to a degree dependent upon the degree of movement of the handle 9 into the application zone. During this movement of the handle 9, the brake pipe 12 continues to be maintained charged from the main reservoir 13 to the adjusted setting of the feed valve 14.

When the selector 10 is in the automatic position, and the handle 9 is in the release position, the straight-air control pipe 11 will be connected to the atmosphere and the brake pipe will be charged as before described. When it is desired to effect an automatic application of the brakes, the handle 9 is first moved to a first service, or slack gathering position, in the case of long trains, and then to full service position. If the train is short in length the brake valve handle may be moved to the full service position in the first instance. In the first service position of the brake valve handle a slow rate of reduction of brake pipe pressure results and in the full service position brake pipe pressure will continue to be reduced at a service rate until the handle is returned to the lap position. The degree of reduction in the brake pipe pressure is thus controlled according to the duration of time in which the handle 9 remains in the full service position. During this manipulation of the handle, the straight-air control pipe 11 will continue to be connected to the atmosphere.

Regardless of what position the selector 10 is in, if the handle 9 is turned to an emergency position, the brake pipe 12 will be vented to the atmosphere directly, by the operation of a separate valve device within the brake valve.

The functioning of the brake valve 1 will be more fully understood from the description of the equipment operation which will follow hereinafter.

The equalizing discharge valve device 2 is embodied in a casing containing a piston 17 subject on its upper side to the pressure of fluid in a chamber 18 and on its lower side to the pressure of fluid in a chamber 19. Attached to the piston 17 is a stem 20 having one end thereof slidable in a bore 21. The stem 20 is recessed at 22 to receive the end of a lever 23. The lever 23 is pivotally mounted as on a pin 24 attached to the casing and has an extension 25 for operating a vent valve 26. The vent valve 26 is normally biased to a seated position by a spring 27, but upon counter-clockwise movement of the lever 23 about pin 24, the vent valve 26 is unseated to open the communication between the chamber 19 and an equalizing discharge passage 28 leading to the brake valve device. The chamber 18 is connected by a pipe 29 to the brake valve device 1 and to an equalizing reservoir 30 by a branch of pipe 29.

Operation of the equalizing discharge valve device is effected by reducing the pressure of fluid in chamber 18 and in the equalizing reservoir, whereupon the piston 17 will be shifted upwardly due to the unbalancing of fluid pressures in the chambers 18 and 19. The upward movement of the piston 17 rotates the lever 23 in a counterclockwise direction about the pin 24 to unseat the vent valve 26. As will appear more clearly hereinafter, unseating of the vent valve 26 allows fluid under pressure in chamber 19 to flow to the atmosphere until the pressure therein becomes slightly less than the pressure in chamber 18 and the equalizing reservoir 30, whereupon the piston 17 will be returned by the unbalanced fluid pressures to the position shown wherein the vent valve 26 is seated by its spring 27. Since the chamber 19 is connected to the brake pipe by way of a branch pipe 16, pipe 31 and vent valve device 3 as more fully described presently, it follows that any reduction of pressure in chamber 19 will effect a corresponding reduction of the pressure in the brake pipe and that the brake pipe pressure reduction can be controlled in accordance with the degree of reduction of the pressure in the equalizing reservoir and in chamber 18.

The vent valve device 3 comprises a casing containing a piston 32, subject on the one side to the combined pressure of fluid in a chamber 33 which is in continuous communication with pipe 39, and that of a spring 34, and subject on the other side to the pressure of fluid in a chamber 35, connected at all times to the branch pipe 16. A restricted port 36 in the piston 32 permits the fluid pressure in chamber 33 to normally equalize into chamber 35 so that the spring 34 is effective to shift the piston 32 to its lower, or normal position. Attached to the piston 32 is a valve 37 which is held on a seat rib 38 by the force of the spring 34 when the pressure in the two chambers 33 and 35 are equalized.

In the lower-most position of the piston 32, a communication is established between the brake pipe 12 and the pipe 16 leading to the brake valve. The chamber 34 above the piston 32 is connected by a pipe 39 to the brake valve device 1 and by a branch pipe to the magnet valve device 4. Upon the release of pressure in the pipe 39 and in the chamber 34, the over-balancing pressure in the chamber 35 will shift the piston 32 to its upper position, wherein the communication between the pipe 16 and brake pipe 12 is cut off and the brake pipe 12 is connected past the valve 37 and the seat rib 38 to the atmosphere through a large port 40. This rapidly reduces the brake pipe pressure, to cause an emergency application of the brakes, as will hereinafter be described.

The magnet valve device 4 is embodied in a casing having therein a valve 41 which is urged toward an unseated position by a spring 42 and actuated to a seated position upon energization of an electro-magnet 43. When the electro-magnet 43 is deenergized the spring 42 unseats valve 41 to establish a communication between the branch of pipe 39 and the atmosphere through a port 44. As long as the electro-magnet 43 is energized, the valve 41 is held to its seat and the communication between the pipe 39 and the atmosphere through port 44 is closed.

The master switch device 5 comprises a casing containing two flexible diaphragms 45 and 46, disposed therein in spaced coaxial relationship and connected by a stem 47. At the outer side of the diaphragm 45 is a chamber 48 connected to the straight-air control pipe 11. On the outer side of diaphragm 46 is a chamber 49 that is connected to a straight-air pipe 50. The two diaphragms 45 and 46 and the casing define a chamber 51 through which the stem 47 extends.

Two movable contact members 52 and 53 are disposed in chamber 51 and rigidly secured to the stem 47 by an insulation spool 54, the contact member 52 being known as the release contact member and the contact member 53 being known as the application contact member. Both contact members are adapted to move with movement of the stem 47 from the position shown toward the right, that is, in the direction of chamber 49, to first effect an engagement of the release contact member 52 with a pair of resilient contact members 55 and 56. A further movement of the stem will effect an engagement of the application contact member with a pair of resilient contact members 57 and 58. The resilient contact members 55, 56, 57 and 58 are spring supported and will yield under pressure to permit continued movement of the insulation spool and the contact members 52 and 53 after engagement with the resilient contact members. The resilient contact members 55 and 58 are connected to a wire 59 connected to the positive terminal of a supply battery 60 by a supply wire 61. The resilient contact member 56 is connected to a release control wire 63, hereinafter referred to as the release wire, and engagement of the contact members 55 and 56 by the contact member 52 results in energization of the release wire. The resilient contact member 57 is connected to an application control wire 62, hereinafter referred to as the application wire, and engagement of the contact members 57 and 58 by the application contact member 53 results in energization of the application wire 62.

Contained in the chamber 49 is a spring-supported stop member 64 which is engaged by the stem 47 at a point in the travel of the stem in which the release contact member 52 engages contact members 55 and 56 and before engagement of the application contact members 57 and 58 by contact member 53. This spring stop serves to stabilize the switch device against any tendency to a pumping action and to define a so-called lap position thereof.

The application and release magnet valve device 6 comprises a casing containing a supply valve 65 normally urged into seated position by a spring 66 and actuated to an unseated position by energization of a winding 67 of an electro-magnet. The supply valve 65 is located in a chamber connected to the feed valve pipe 15 by a branch pipe 68. When unseated, the supply valve 65 will permit the flow of fluid under pressure from the branch pipe 68, past the valve 65, to a chamber 69 to which the straight-air pipe 50 is connected. Also disposed in the magnet valve device casing is a release valve 70 which is normally urged to an unseated position by a spring 71 to connect the straight-air pipe 50 to the atmosphere via a port 73 and actuated into a seated position by energization of a winding 72 of an electro-magnet.

One terminal of the winding 67 is connected by a branch wire 62a to the application wire 62 which extends through the train. The other terminal is connected by a branch wire 75a to a battery return wire 75 connected to the negative terminal of the supply battery 60.

One terminal of the winding 72 is connected by a branch wire 63a to the release control wire 63 which extends through the train and the other terminal is connected by the branch wire 75a to the battery return wire 75. Energization of the application and release windings 67 and 72 is thus controlled by the master switch device 5 as will be hereinafter explained.

The automatic brake control device 7 comprises a casing having therein a piston 74, subject on one side to the pressure of fluid in a chamber 76, and on the other side to the pressure of fluid in a chamber 77. The piston 74 is provided with a stem 78, which is recessed to receive, and to move with movement of the piston, a graduating slide valve 79. The stem 78 is further provided with collars 80 and 81 so spaced as to engage a main slide valve 82 therebetween with a certain lost motion.

The chamber 76 is connected by a branch pipe 83 to the brake pipe 12. The chamber 77, in which is located the stem 78 and the slide valve 82, is connected by a branch pipe 84 to the auxiliary reservoir 85. The parts of this automatic brake control device brake are illustrated in what is known as the brake release position, in which the auxiliary reservoir 85 and the slide valve chamber 77 are charged from the brake pipe 12 by way of the branch pipe 83, chamber 76 and a feed groove 86, which in this position of the piston 74 connects the chambers 76 and 77. In this release position of the slide valve 82, a cavity in the slide valve connects a passage and pipe 87 leading to a double check valve 88, and to the brake cylinder 8 during an automatic brake application, to an atmospheric port 89 for the release of fluid pressure in the pipe 87 and the brake cylinder.

With the brake pipe and the auxiliary reservoir charged with fluid under pressure, a reduction of the brake pipe pressure at a rate sufficient to create the necessary differential pressure across the piston 74 causes the piston to be shifted to the left. The initial movement of the piston and the graduating valve 79 uncovers a service port 90 in the main slide valve 82, the piston simultaneously closing the feed groove 86, cutting off communication between the chambers 76 and 77. The continued movement of the piston 74 by reason of the brake pipe reduction causes the collar 81 on the piston stem to engage the slide valve 82 and move it to a position in which the service port 90 registers with the port and pipe 87. Communication is thus established through which fluid under pressure is supplied from the auxiliary reservoir 85 past the valve element of the double check valve 88 to the brake cylinder 8 to establish fluid pressure therein, resulting in an application of the brakes. As the auxiliary reservoir pressure is reduced by flow of fluid under pressure therefrom to the brake cylinder, in effecting the brake application, the unbalance of forces in effect across the piston 74 is diminished and when the auxiliary reservoir pressure is reduced slightly below the pressure in the brake pipe and connected chamber 76, the piston and the graduating valve will be moved in the right-hand direction to a so-called "lap" position in which the graduating valve 79 covers the service port 90 and cuts off further supply of fluid under pressure through the communication between the auxiliary reservoir and the brake cylinder.

When fluid under pressure is again supplied to the brake pipe 12 for restoring the pressure therein, as will hereinafter be described, the predominating force of brake pipe pressure over the auxiliary reservoir pressure will cause the piston 74 to move the main slide valve into the release position, in which it is shown, again connecting the brake cylinder to the atmospheric port 89 and opening the feed groove 86 to permit a recharge of the auxiliary reservoir.

The equipment just described is a simplified combined automatic and straight-air brake control equipment such as may be applied to the locomotive. For simplicity the brake control apparatus for the cars is not shown in the drawings but it should be understood that the equipment on each car may include an application and release valve device 6, an automatic brake control device 7, an auxiliary reservoir 85 and a brake cylinder 8. The application and release valve device 7 on each car is connected by a pipe to receive its supply of fluid pressure from the auxiliary reservoir on the respective car or from a separate supply reservoir charged from the brake pipe. The electro-magnet windings 67 and 72 on the cars are connected in a manner similar to that shown for the locomotive, namely to the application wire 62, release wire 63 and battery return wire 75 which extend from the locomotive through each car to the last car of the train. The respective application and release magnet valves on the locomotive and all cars of the train are thus controlled simultaneously by selective control of energization of the application and release wires.

Assuming that the main reservoir 13 is charged with fluid under pressure, and that the selector 10 is in the straight-air operation position, the apparatus thus far described will operate as follows:

With the brake valve handle 9 in the release position, the fluid from the main reservoir 13 will flow, at a certain pressure regulated by the feed valve 14, to the pipe 15, then through the rotary valve of the brake valve 1, to the pipe 16 leading to the vent valve device 3 and to the brake pipe 12. Fluid under pressure in brake pipe 12 flows by way of the branch pipe 83 to enter chamber 76 on the face of the piston 74 of the automatic brake control device 7 on the locomotive and similar devices on each of the cars in the train. With no pressure in the auxiliary reservoir, brake pipe pressure in chamber 76 will force the piston 74 to the position in which it is shown wherein the feed groove 86 is opened to allow communication from the chamber 76 to the chamber 77 and to the auxiliary reservoir 85. After sufficient time the auxiliary reservoir 85 on the locomotive and all cars of the train will be charged to the brake pipe pressure as regulated by the feed valve 14. At this same time, fluid under pressure as regulated by the feed valve 14 is permitted to flow through a restricted port in the rotary valve of the brake valve to pipe 29 leading to the equalizing reservoir 30 and to chamber 18 above the equalizing piston 17. With the brake pipe pressure, active in chamber 19 below the equalizing piston 17, of equal value to the equalizing reservoir pressure in chamber 18, the weight of the piston 17 together with the force of spring 27 acting against the exhaust valve 26 will maintain the exhaust valve on its seat. In this release position of the brake valve handle 9, the straight-air control pipe 11 is connected through the self-lapping portion of the brake valve 1 to the atmosphere. The brake cylinder 8 on the locomotive and on each car in the train attached to the locomotive may be connected to the atmosphere either through pipe 87, the cavity in the slide valve 82 and port 89 in the automatic brake control device, or may be connected through the straight-air pipe 50 to the atmosphere past the release valve 70 of the magnet valve devices 6.

To effect an application of the brakes, the handle 9 is moved from the release position toward the full service position to an extent according to the desired degree of application of the brakes, that is, the degree of angular movement of the handle determines the degree of the brake application.

With the selector 10 in the straight-air operation position, the self-lapping portion of the brake valve device is operative to control the flow of fluid under pressure from the feed valve pipe 15 to pipe 11 and to chamber 48 of the master switch device to a value proportional to the degree of movement of the handle 9 in the direction of the full service position. Fluid under pressure in chamber 48 will operate the switch portion, to in turn effect operation of the application and release magnet valve device 6, as before described, to establish a pressure in the straight-air pipe 50 equal to the pressure in pipe 11 and chamber 48. Since the straight-air pipe is connected by way of the double check valve 88 to the brake cylinder 8, it follows that fluid pressure will be established in the brake cylinders equal to the straight-air pipe pressure.

The degree of the application may be increased by moving the brake valve handle further toward the full service position, and may be decreased by moving the handle toward the release position. When it is desired to effect a full release of the brakes, the brake valve handle is returned to the release position, whereupon fluid supplied to pipe 11 and to chamber 48 is released to the atmosphere by the self-lapping portion of the brake valve. Fluid pressure in the straight-air pipe 50 and hence the brake cylinders is effective in chamber 49 to effect operation of the switch portion of the master switch device to control the application and release magnet valve devices to release the straight-air pipe and brake cylinder pressures to the atmosphere.

When it is desired to effect an application of the brakes by automatic operation, the selector 10 is first moved to the "automatic" position. Then with the brake pipe and auxiliary reservoirs throughout the train charged to the setting of the feed valve 14, as before described, the handle 9 is moved from the release position through a "lap" position into the service position. In this service position of the handle 9, the rotary valve in the brake valve disconnects the branch pipe 16 and the equalizing reservoir pipe 29 from the feed valve pipe 15, and connects the equalizing discharge pipe 28 to the atmospheric exhaust and fluid pressure in the equalizing reservoir to exhaust through a restricted passage. Fluid under pressure in the equalizing reservoir 30 and in chamber 18 of the equalizing discharge valve device thus reduces to the atmosphere at a controlled rate during all the time the handle 9 is in the service position. As soon as the desired degree of reduction of equalizing reservoir pressure is effected, the brake valve handle 9 is returned manually to the lap position. The reduction in fluid pressure in chamber 18 results in an unbalance of pressures across piston 17 with the result the piston moves upwardly unseating valve 26 to reduce brake pipe pressure to the atmosphere until brake pipe pressure is reduced to the reduced value of the equalizing reservoir pressure.

When a reduction of brake pipe pressure is effected, a corresponding reduction of fluid pressure takes place in chamber 76 of the automatic brake control devices 7 on the locomotive and each car of the train. The piston 74 is shifted to the service position so that fluid pressure from the auxiliary reservoir is connected through the slide valve port 90 to the brake cylinder until auxiliary reservoir pressure is reduced to a pressure corresponding to slightly less than brake pipe pressure when the piston moves to the lap position wherein the graduating valve 79 covers the service port 90 to cut off further flow of auxiliary reservoir pressure to the brake cylinder.

It will be obvious that the degree of the brake application is controlled according to the degree of reduction in the equalizing reservoir pressure and that a graduated control of the brakes is obtainable by proper manipulation of the brake valve handle.

To effect a release of the brakes following an automatic application, the brake valve handle 9 is returned to the release position in which the brake pipe pressure is restored from the main reservoir. The increasing brake pipe pressure is effective in the automatic brake control device 7 to force the piston 74 to release position in which the auxiliary reservoir may be recharged and the brake cylinder pressure is connected to the atmosphere.

An emergency application of the automatic brakes may be effected manually by movement of the brake valve handle to emergency position, in which position the rotary valve of the automatic brake valve is positioned to connect the pipe 16 to the atmosphere through a large opening, or by removal of the operator's hand from the brake valve handle in the well-known manner of "deadman" control. In this latter instance, fluid pressure is released from pipe 39 and chamber 33 of the vent valve through the brake valve. The piston 32 is unbalanced by reason of the loss of fluid pressure in chamber 33, and the piston 32 thus moves upwardly to cut off communication from pipe 16 to brake pipe 12 and at the same time connect brake pipe 12 to the atmosphere through the large port 40 to effect reduction of the pressure therein at a rapid rate.

An emergency application of the automatic brakes may be further effected automatically by deenergizing the magnet valve device 4.

The magnet valve 4 is shown normally energized by a circuit from the supply battery controlled by a speed responsive switch 91 and, as will be explained later, by the circuit checking equipment constituting my invention. Deenergization of the magnet valve 4 by any cause such as loss of supply current, operation of either the speed-controlled switch or the circuit checking equipment will result in the venting of fluid pressure from chamber 33 of the vent valve device 3 and in an emergency venting of brake pipe pressure to the atmosphere.

Emergency venting of the brake pipe pressure results in brake pipe pressure being quickly reduced to atmospheric pressure. Such a reduction in fluid pressure in chamber 76 of the automatic brake control device 7 results in movement of the piston 74 to application position and in equalization of auxiliary reservoir pressure into the brake cylinder thus producing an application of the brakes with maximum force.

According to my invention, the circuit checking and signalling apparatus, which I propose to use in conjunction with the above described brake control equipment to indicate the operative condition of the brake control circuits and to effect an automatic application of the brakes should the operator attempt a straight-air brake application when the electrical control circuits are faulty, is shown in Fig. 2. This circuit checking apparatus comprises essentially a Wheatstone bridge arrangement for each of the two brake control circuits to be checked. It will be recalled that the brake equipment just described employs two control circuits, namely (1) the release control circuit comprising the release control wire 63 and the return or ground wire 75 extending throughout the train with the windings 72 of the release magnet valve on the locomotive and different cars in the train connected in parallel therebetween and (2) the application control circuit comprising the application control wire 62 and the return or ground wire 75 with the windings 67 of the application magnet valves on each of the different cars in the train connected in parallel therebetween.

The circuit checking equipment comprises two similar Wheatstone bridge arrangements 92 and 93, the bridge arrangement 92 being applied to the application control circuit and the bridge arrangement 93 being applied to the release control circuit. These bridge arrangements together with the necessary cooperating relays and indicating signals are included in a portable equipment case 94 with the necessary lead wires, as identified hereinafter, for connecting to the train wires, and to the signals, etc. Each bridge arrangement comprises the usual four branches, one of the branches including the control circuit to be checked. Specifically, the Wheatstone bridge arrangement 92 includes as one branch thereof a fixed resistor 95, and a second branch including, in series, a fixed resistor 96 and a temperature compensating resistor 97. The temperature compensating resistor may be located remotely of the portable case 94 so as to be subject to the atmospheric temperature and not influenced by locomotive cab or control car temperature where the checking equipment may be located. Automatic compensation for changes in control circuit resistance due to atmospheric temperature variation is thus accomplished. The resistor 97 is connected into the bridge branch by suitable leads 98 and 99 between the resistor and suitable binding posts on the equipment case. A condenser 100 carried within the case 94 is connected across the leads to said binding posts so as to parallel the resistor 97 and serves to prevent any inductive effect of current variations in the bridge circuit from influencing the bridge balance condition.

Another or third branch of the bridge arrangement 92 includes the application magnet control circuit. This branch includes wire 101, resistor 102, switch contact member 103 of a relay 104, hereinafter to be described, wire 105, binding post 106 on the case, lead 107 to the application train wire 62, then over the various application magnet windings 67, in parallel, to the battery return or ground wire 75, lead 108, binding post 109 on the case 94, fuse 110, switch 111, wires 112 and 113 to the junction 114.

The fourth branch of the bridge arrangement comprises wire 115, resistors 116 and 117, wire 118, variable resistor or rheostat 119, having a manually operable contact arm 120, and wire 121 to the junction 114. Operation of the contact arm 120 is arranged to effect operation of a switch 122 to closed position, for a purpose hereafter explained, when the arm is positioned for more than a predetermined number, say five, cars in the train as indicated on an escutcheon plate 123.

The first branch of the bridge 92, resistor 95, is joined to the resistor 96 of the second branch at a junction 124 and to the fourth branch at the junction of wire 115 with the resistor. The second branch of the bridge is joined to the third branch of the bridge by wire 125 and a back contact member 126 of a relay 127 later to be described.

Operatively responsive to a balanced and an unbalanced condition of the bridge circuits and connected in series between wires 115 and 125 are a detector relay 128 and a meter 129. The meter 129 is normally short-circuited by a circuit including a wire 130, a normally closed switch contact member 131 of a manually operable switch 132, hereinafter described, and wires 133 and 125 to remove the resistance of the meter from the relay circuit during the automatic operation of the bridge arrangement.

Further associated with the bridge 92 is a circuit including wire 113, a normally closed switch contact member 134, of switch 132, wire 135, to contact member 126 of a relay 127 and a contact member 136 of a relay 137 to be described later. This circuit is arranged under certain conditions to alternately short-circuit first the third branch and then the fourth branch of the bridge to produce an intentional unbalanced condition thereof.

The resistors 102 and 116 in the third and fourth branches of the bridge arrangement are matched ballast resistors included in the bridge circuit to increase the potential across and insure operation of the detector relay 128 when checking the control circuit of a long train wherein the resistance of the third and fourth branches is low.

The resistor 117 in the fourth branch of the bridge is of a value equal to the resistance of the winding 67 of the application magnet on the locomotive. With the resistance of the locomotive brake control equipment in the third branch of the bridge thus matched in the fourth branch, the resistor 119 and contact arm 120 can be calibrated such that the exact number of application control magnet windings in the train brake control equipment can be determined by adjusting the contact arm on the resistor until the bridge arrangement is in a balanced condition.

Two current limiting resistors 138 and 139 are placed in series in the voltage supply circuit for the bridge arrangement. The resistor 138 is omitted when the checking equipment is used on circuits of the same operating voltage as that for which the equipment was designed and is employed when checking circuits operating on a higher voltage. The resistance of the resistor 138 is thus determined by the voltage applied to the checking equipment in excess of that for which the equipment is designed. The resistor 139 is arranged to be cut in by switch 122 when less than a given number of cars, say five, are included in the train to avoid possible undesired energization of the application control circuit at that time and the consequent undesired application of the brakes. The switch 122 is arranged to be automatically opened to cut resistor 139 in by a cam on a shaft, indicated by the broken line, supporting the arm 120 when the arm indicates less than five cars.

The bridge arrangement 93 is substantially identical in construction to the bridge arrangement 92 and it is deemed unnecessary, therefore, to describe bridge arrangement 93 in detail as this may be understood from the previous description of bridge arrangement 92.

The reference numerals 140 to 175, inclusive, are thus applied without repetitive description to identify the elements of the bridge arrangement 93, in consecutive order corresponding to application of the numerals 95 to 139 inclusive to the elements of bridge arrangement 92, except in cases where the elements are common to both of the bridge arrangements. It will be understood, of course, that the third branch of the bridge arrangement 93 includes the release control circuit instead of the application control circuit.

A two-winding polarized relay 176 is associated with the relays 128, 166, 137 and 127 and cooperates with these relays to produce a coding operation of a given frequency, when the two control circuits being checked retain their fidelity, as will be explained later under "Operation." This relay includes the windings 177 and 178 and the contact members 179, 180 and 181. Energization of winding 177 will cause the relay contact members to assume the right-hand position as viewed in the drawing and energization of winding 178 will cause them to assume the left-hand position. This being a polarized relay, energization of either winding need only to be momentary, the relay contact members remaining in the selected position until the other winding is energized.

The relay 127 includes the contact members 126 and 165, already mentioned, and the contact members 182, 183 and 184. The contact members 126 and 165 are front and back contact members, that is, one contact is made when the winding of the relay is energized and another is made when the winding is not energized. The contact members 182, 183 and 184 are front contact members, that is, there are actuated from a dropped-out or open position to a picked-up or closed position when the winding of the relay is energized.

The relay 137 includes the front contact members 136 and 173, already mentioned, together with the front contact members 185, 186 and 187.

Relay 128 includes a front contact member 188 and a back contact member 189. Relay 166 is identical in construction to relay 128 and includes a front contact member 190 and a back contact member 191. The term "back contact member" identifies a contact member that is actuated from a dropped-out or closed position to a picked-up or open position when the winding of the relay is energized.

This circuit checking equipment further includes a signal relay 192 having the front contact members 193, 194 and 195 and the "front and back" contact members 196 and 197.

The relay 104 is a two-winding relay, one winding 198 of which is normally energized to actuate the relay to a pick-up position by means of a circuit apparent in the drawing controlled by a pneumatically operated switch device 199. Switch device 199 has two contact members 200 and 201 which are spring-actuated to a closed position when fluid pressure in the switch is less than a preselected value, say five pounds per square inch, and actuated to open position by fluid pressure exceeding such pressure.

A second winding 202 of relay 104 is included in a circuit extending from the release control wire 63 by way of lead 151, wire 149, a wire 203, contact member 201 of switch 199, wire 204, winding 202, and wire 205 to wire 112, then by way of switch 111, fuse 110, lead 108 and wire 75 to the negative side of the battery. The current flow through winding 202 produces a magnetic effect in opposition to that of winding 198 so as to cause the relay to assume a deenergized or dropped-out position when the windings 198 and 202 are simultaneously energized. This operation occurs at the initiation of a brake application when the release contacts of the master switch 5 are closed before sufficient straight-air pipe pressure is established to cause the switch 199 to open the contacts 200 and 201. This operation will be more fully explained later.

Relay 104 further includes the front contact members 103 and 148, already mentioned, together with a front contact member 206 and the "front and back" contact members 207, 208 and 209.

Relays 192 and 104, through their contact members 196, 197, 207 and 208 control signals 210, 211 and 212 on the equipment box, together with and in parallel with signals 213, 214 and 215 in the operator's cab or compartment as will later be explained.

The switch 132 comprises the heretofore mentioned switch contacts 134, 131, 171 and 169 which are normally closed by spring forces together with a normally open contact member 216, said contact member being spring returned to the open position when manual forces are moved from the switch. The handle of this switch is operative to a position one side of a normal position for operation of the spring closed contact members 134, 131, 171 and 169 to the open position. The handle is operative to a position at the opposite side of the normal position for closing the contact member 216 against spring force.

A pneumatic switch device 217 includes normally closed contact members 218 in parallel with the contact member 195 of the signal relay 192 in a circuit including the magnet valve device 4 and the switch device 91. The pneumatic switch is controlled by fluid pressure in the straight-air control pipe 11 and is arranged to open the contact member 218 so long as a pressure exceeding a predetermined low pressure of say five pounds per square inch is established in the control pipe 11.

Supply battery voltage is provided in this circuit checking apparatus from the positive battery wire 61 by way of lead 219, binding post 220, fuse 221 and switch 222 to wire 223. To avoid needless repetition, hereinafter, the wire 223 will be referred to as the "battery supply wire" and circuits traced by reference thereto.

In like manner the wire 112 being connected to the negative side of the battery 60 by wire 75, lead 108, binding post 109, fuse 110 and switch 111 will hereinafter be referred to as the "battery return wire" and circuits will be traced with reference thereto.

*Operation*

In conditioning the circuit checking apparatus for operation, the operator first balances the bridge arrangements by moving the control handle of switch 132 into the position for opening the contact members 134, 131, 171 and 169. The circuits for short-circuiting the third and fourth branches of the two bridge arrangements are thus opened by the opening of the contact members 134 and 171. The opening of contact members 131 and 169 opens the circuits by-passing the meters 129 and 167. The contact arms 120 and 159 are manually adjusted on the resistors 119 and 158 until a zero reading of the meters 129 and 167 is given. A balanced condition of the bridge arrangement is thus obtained, in which condition the resistance of the variable resistor in the fourth branch of the bridge is equal to the resistance of the train brake control circuit inclinded in the third branch of the bridge arrangement. The position of the contact arm on the variable resistor should indicate on the escutcheon plate the number of brake control units in the train attached to the locomotive. If this indication does not agree with the number of cars in the train, a faulty circuit condition is thus indicated. For example, if both contact arms 120 and 159 are positioned to indicate eight cars in the train when in reality there are ten cars. an indication is given that the train line connector between cars eight and nine is separated or that the return circuit 75 is open between cars eight and nine. If one of the contact arms is positioned to indicate eight cars and the other contact arm positioned to indicate ten cars in the train, the indication is that the control circuit included in the bridge arrangement giving the eight car indication is open between cars eight and nine.

A grounded control circuit, or a short-circuit between the control wire and the return wire is indicated by an indication of more cars in the train than there actually are and by an inability to balance the bridges by contact arm adjustment on its respective resistor.

With the bridge arrangements balanced, the brake valve handle 9 in release position, and the selector 10 in straight-air operation position, the contact members 200 and 201 of the switch device 199 and contact member 218 of the switch device 217 are closed, responsive to the atmospheric pressure values in the straight-air pipe 50 and the straight-air control pipe 11. A circuit is thereby coupled from the battery supply wire 223 by way of wire 224, contact member 200, wire 225, winding 198 of the relay 104 and wire 226 to the battery return wire 112, energizing the winding 198 and actuating the relay to a picked-up condition in which the front contact members 103, 148, 206 are closed and "front and back" contact members 208 and 209 are in their upper closed positions. A circuit is thus established from the battery supply wire 223 by way of the contact member 209, wire 227, to wire 228, thence through resistors 174 and 175 to the junction 163 of the first and second branches of bridge arrangement 93 and through resistors 138 and 139 to the junction 124 of the bridge arrangement 92. Parallel circuits are now completed by first and fourth branches and second and third branches of each bridge arrangement to the respective junctions 114 and 153 which are connected to the battery return wire 112 by wires 113 and 152.

A circuit for charging the condenser 233 is also completed from the wire 228 via wire 229, resistor 230, wire 231, contact member 180 in its left-hand position and wire 232 to condenser 233, the opposite side of which is connected to the battery return wire 112 by wire 234.

The bridge arrangements having been balanced, the relays 128 and 166 are deenergized. A circuit is now complete for energizing relay 137 via the back contact members 189 and 191, wire 235, contact member 179 in its left-hand position, the winding of relay 137 and wire 234 for actuating the relay 137 to a picked-up condition in which the front contact members 136, 173, 185, 186 and 187 are in closed position. The fourth branch of bridge arrangement 92 is short-circuited via closed contact member 136, wire 135 closed contact member 134 to junction 114, and the fourth branch of bridge arrangement 93 is short-circuited via closed contact member 173, wire 172, closed contact member 171 to junction 153.

By reason of the reduced resistance of the short-circuit path as compared to the third branch of the bridge arrangements, current will flow from the junction of the second and third branches by wire 133, contact member 131, wire 130, the winding of relay 128 and the short-circuit path to the battery return wire to actuate relay 128 to a picked-up condition. The relay 166 of bridge 93 is energized by a similar circuit. With relays 128 and 166 simultaneously energized, the back contact members 189 and 191 are opened and the front contact members 188 and 190 are closed.

The back contact members 189 and 191 are effective in their open position to interrupt the circuit previously traced for energizing the winding of the relay 137 and the front contact members 188, 190 and 185 are effective when in closed position to establish a circuit for energizing the upper winding 177 of the relay 176 to effect movement of the relay contact members 179, 180 and 181 from their left-hand position to their right-hand position as seen in the drawing.

Movement of the contact member 180 of relay 176 from the left-hand position to the right-hand position first opens the circuit from the battery supply wire and wire 231 for charging the condenser 233 and then closes a circuit over wire 237 for charging the condenser 238. Relay 137 is not dropped out instantly when contact member 179 of relay 176 shifts to its right-hand position but is held picked-up for an interval of time by discharge of current from condenser 233 through the loop circuit including the winding of the relay 137, the front contact member 186, and a resistor 239. During this period of time in which the contact member 187 of relay 137 is maintained picked-up by current discharged from the condenser 233, the contact member 181 of relay 176 in its right-hand position completes a circuit from the battery supply wire 223 over the contact member 209, wire 227, the contact 187 of relay 137 and contact member 181 of relay 176 to energize a wire 240 leading to the contact members 216 and 193.

After the condenser 233 is discharged and no longer maintains the relay 137 in a picked-up position, the relay is restored to the dropped-out position opening the front contact members 136, 173, 185, 186 and 187. Contact member 187 thus acts to open the circuit for energizing the wire 240. With the contact members 136 and 173 open, the circuit for short-circuiting the fourth branch of each of the bridges 92 and 93 is open and the bridges are returned to their normal condition. If the train circuit has not changed in its resistance, the bridges will remain balanced and the relays 128 and 166 will become deenergized, thus opening the front contact members 188 and 190 and closing the back contact members 189 and 191.

The closing of back contact members 189 and 191 now closes a circuit from the supply wire 228 over wire 229, resistor 230, contact members 189 and 191 over wire 235 and the contact member 179 in its right-hand position, the winding of relay 127 to the battery return wire by way of wire 234. The relay 127 is thus energized and actuated to the picked-up position in which the contact members 126, 165, 182, 183 and 184 are closed. The closing of contact member 126 completes a low resistance substitute circuit from a junction of the second and third branches of the bridge arrangement 92 over the front contact member 126, wire 135, contact member 134 to the junction point 114 for the third branch of the bridge arrangement 92 which is opened by the opening of the back contact member 126. The third branch of the bridge arrangement 93 is also substituted for by a similar low resistance circuit. The relays 128 and 166 are now energized by reason of flow of current from the junction of the first and fourth branches of the bridge over the relay winding and the short circuit path to the battery return wire through the relay winding in a direction opposite to the current flow in the windings as a result of a short-circuiting of the fourth branches of a bridge. The closure of contact member 182 by the energization of relay 127 prepares a circuit which is completed, by the closing of contact members 188 and 190, from the wire 229 and resistor 230 over the lower winding 178 of relay 176 to the battery return wire 234 for energizing the relay 176 and effecting movement of the contact members 179, 180 and 181 from their respective right-hand positions back to their respective left-hand positions.

A circuit is now completed from the wire 228 over the closed front contact member 184 of relay 127, the contact member 181 in its left-hand position for momentarily energizing the wire 240. The shift of the contact member 180 from its right-hand to its left-hand position removes the battery supply voltage from the condenser 238 and the closed contact member 183 supplies the charge of the condenser 238 over a resistor 241 to energize the winding of the relay 127 for holding the relay picked-up for a predetermined period of time. As soon as the condenser 238 is discharged, the relay 127 is deenergized or dropped-out, thus opening front contact members 182, 183 and 184 and shifting contact members 126 and 165 to their lower closed positions. The fourth branches of the bridge arrangements 92 and 93 are restored in the bridge arrangement and if the bridge balance remains true the relays 128 and 166 become deenergized to condition the bridge circuit for another cycle of operation.

From the above description it can be seen the continuous operation of the bridge circuit, and the relays 128, 166, 137, 127 and 176 will be effected so long as the bridge circuits remain balanced. The cycle of operation occurs at a selected frequency, such as thirty times per minute. Since two impuses of current per cycle are transmitted over wire 240 to the contact members 216 and 193, this means that, in the instance given above, the frequency of current impulses would be of the order of 60 per minute.

With the equipment operating as just described, the operator will move the control lever of the switch 132 to position for closing the contact member 216. With the contact member 216 closed, an impulse of current will be supplied within two seconds of time over the contact member 216 and wire 242, over the closed contact member 206 and a resistor 243 for energizing the winding of relay 192 and effecting movement of the contact members 193, 196, 197, 194 and 195 to the closed or upper closed positions. The impulse of current for energizing the relay 192 is also supplied to the condenser 244 for charging the condenser. With the condenser 244 charged to the battery voltage, it will by reason of a closed circuit hold the relay 192 energized for slightly more than a two second period until another impulse of current is provided over the wire 240. With the relay 192 energized and the front contact member 193 closed, it will no longer be necessary to hold contact member 216 of switch 132 in closed position. Any impulse of current provided on wire 240 will be supplied by way of contact member 193, wire 242, a closed contact member 206 and the resistor 243 for energizing the winding of relay 192 and recharging the condenser 244. It can thus be seen that so long as the impulses are supplied to the wire 240 at the prescribed interval of time before the condenser 244 becomes discharged the relay 192 will be maintained energized and consequently picked-up.

While the relay 192 is maintained picked-up, a circuit for energizing the signal 210 is completed from the battery supply wire 223 over resistor 245, contact members 196 and 207 in their upper closed positions, the signal 210 to the battery return wire 112. At the same time, battery voltage from the supply wire 223 is supplied over the resistor 246, the contact members 197 and 208 in their upper closed positions, to energize the signal 213 in the cab of the locomotive. The signals 210 and 213 are energized until a faulty condition of the bridge circuit is encountered, or until a brake application is made.

Should a change in resistance of either or all control circuits arise, such changes being caused by failure of magnet windings, couplers, wires, by loss of or addition of cars, short or grounded circuits, etc., the bridge arrangement will not balance when the short circuits of the bridge branch is removed. In such case, the detector relay in the respective bridge arrangement will not "drop out." The circuit over contact members 189, 191, wire 235, contact member 179, to energize the selected relay 137 or 127 is thus not made. The coding operation of relays 128, 166, 137, 127 and 176 is thereby interrupted and the impulse for recharging the condenser 244 fails, thus the relay 192 becomes deenergized. With relay 192 thus deenergized the back contact members 196 and 197 are closed and the front contact members are open. The back contact member 196 in closed position is effective to complete a circuit from the supply wire 223 by way of the resistor 245 for energizing the danger signal 212. At the same time battery voltage is supplied over resistor 246, back contact member 197 for energizing the danger signal 215 in the locomotive cab. As has been explained, the operator can, by operating the switch 132 to open the normally closed contact members and by adjustment of the contactor arms 129 and 159 determine the location and nature of the fault in the control circuit.

If during the time the clear signals 210 and 213 are energized, the operator desires to make a straight-air brake application the release wire 63 will first be energized, as has been explained, and circuit will be provided for energizing the lower winding 202 of relay 104 by way of the lead 151, wires 149 and 203, the switch contact member 201, of the switch 199, wire 204, the lower winding 202 of the relay 104, and wire 205 to the battery return wire 112. This energization of winding 202 will effect movement of the relay 104 to the dropped out position in which the front contact members are opened and the back contact members 207 and 208 and 209 are shifted to their lower closed positions. The back contact member 209 closes a circuit from the battery supply wire 223, by way of the back contact member 209, the front contact members 194, resistor 243 for maintaining the relay 192 energized from the battery supply voltage. At the same time, battery voltage is provided from the supply wire 223, resistor 245, the front contact member 196, the back contact member 207 to energize the signal 211 and over resistor 246, front contact member 197, back contact member 208 for energizing the signal 214 on the locomotive cab. The signals 211 and 214 when energized indicate that a brake application is effective throughout the train.

The front contact member 195 of the relay 192 is closed except during a fault indication when the relay 192 is deenergized. The contact member 195 is included in parallel with the contact members 218 of the pneumatic switch 217 to control a circuit for energizing the magnet valve device 4 (Fig. 1). The switch device 217 is effective to disengage or open the contact members 218 when a given fluid pressure is established in straight-air control pipe 11. It can thus be seen that if a fault indication is given by the circuit checking appaartus the contact member 195 will be open and if the operator attempts a straight-air brake application, the switch contacts 218 will be opened to open the circuit energizing the magnet valve device 4. The chamber 33 of the vent valve device 3 is thereby vented and, as previously described, an automatic brake application is effected by the venting of fluid pressure from the brake pipe by operation of the vent valve device.

It should be understood that while my invention has been disclosed specifically in connection with two control circuits, it is not limited in its operation to any particular number of control circuits. In other words, it may be employed in connection with a single control circuit or more than two control circuits. If my invention is employed in connection with a single control circuit, only one corresponding bridge arrangement and one detector relay is required to control the operation of the coding relays. If my invention is employed in connection with more than two control circuits, a corresponding number of bridge arrangements and detector relays will be employed with the contact members of the detector relays connected in series relationship for control of the coding relays.

Having now described my invention, what I claim as new and desire to secure by Letters Patent, is:

1. For use with an electric brake control system for a train of cars which system includes an electric control circuit and an electro-responsive control unit on each car operating on said circuit, a fidelity checking apparatus comprising a Wheatstone bridge arrangement having as one branch thereof the control circuit and having a second branch including an adjustable resistor unit for effecting a balanced condition of the bridge arrangement, means associated with said resistor unit calibrated to indicate the number of electro-responsive control units effectively operating on the control circuit, said resistor unit and calibrated means cooperating to verify the integrity of the control circuit so long as the indication given corresponds to the actual number of cars in the train and to indicate the location of a fault when there is variance between the indication and the actual number of cars.

2. For use with an electric brake control system for a train of cars which system includes an electric control circuit and an electro-responsive control unit on each car operating on said circuit, a fidelity checking apparatus comprising a Wheatstone bridge arrangement having as one branch thereof the control circuit and having a second branch including an adjustable resistor unit for effecting a balanced condition of the bridge arrangement, said resistor unit being calibrated to indicate the number of electro-responsive control units effectively operating on the control circuit and effective to verify the integrity of the control circuit so long as the indication given corresponds to the actual number of cars in the train and to indicate the location of a fault when there is variance between the indication and the actual number of cars, relay means responsive to the balanced condition of the bridge arrangement to produce an intentional unbalanced condition thereof and responsive to the intentional unbalanced condition of the bridge arrangement to restore the balanced condition thereof so long as no fault exists on said control circuit, and means responsive to the continued operation of the said relay means to repeatedly effect the balanced and unbalanced conditions of said bridge arrangement in succession for indicating the integrity of the brake control circuit.

3. For use with an electric brake control system for a train of cars which system includes an application control circuit having an electro-responsive application control unit on each car of the train operating thereon and a release control circuit having an electro-responsive release control unit on each car operating thereon, apparatus comprising a Wheatstone bridge arrangement including the application control circuit as a branch thereof and another Wheatstone bridge arrangement including the release control circuit as a branch thereof, each bridge arrangement further including as a second branch thereof a resistor unit adjustable to conform to the resistance of the corresponding control circuit to produce a balanced condition of that bridge arrangement, said resistor unit being calibrated to indicate the number of control units operating effectively on the corresponding circuit and effective to verify the integrity of the control circuit so long as the indication as to the number of control units corresponds to the actual number of cars in the train and to indicate the location of a fault when there is variance between the indication and the actual number of cars, relay means operative to simultaneously vary the resistance of said one branch of each bridge arrangement and then the said second branch of each bridge arrangement for periodically producing an intentional unbalanced condition of each bridge arrangement, a plurality of detector means each associated with a corresponding bridge arrangement and having a normal position responsively to the balanced condition of the corresponding bridge arrangement and actuated to a different position responsively to the unbalanced condition of the corresponding bridge arrangement, said plurality of detector means being effective so long as they operate in synchronism for causing said relay means to operate in repeated cycles to effect the unbalanced and balanced conditions of the bridge arrangements, said relay means being effective, so long as it continues to operate, to produce a coded signal having at least a certain frequency, and means responsive to said coded signal of a certain frequency for indicating the integrity of said plurality of control circuits.

4. Apparatus for checking and indicating the integrity of an electric control circuit, said apparatus comprising a Wheatstone bridge arrangement having the control circuit to be checked as a branch thereof and having a resistor unit constituting another branch of said bridge arrangement capable of adjustment to conform to the resistance of said control circuit whereby to balance said bridge arrangement, means effective, once the bridge arrangement is balanced, to compensate for variations in the resistance of the control circuit due to changes in atmospheric temperature to prevent undesired unbalance of the bridge arrangement due to temperature changes, means responsive to the balanced condition of the bridge arrangement to produce an intentional unbalanced condition thereof and responsive to the intentional unbalanced condition of the bridge arrangement to restore the balanced condition thereof so long as no fault on said control circuit occurs, and means responsive to the continued operation of the last said means to repeatedly effect the balanced and unbalanced condition of said bridge arrangement in succession for indicating the integrity of said control circuit.

5. Apparatus for checking and indicating the integrity of an electric control circuit, said apparatus comprising a Wheatstone bridge arrangement including as one branch thereof a fixed resistor, a second branch including a temperature compensating resistor, a third branch including said control circuit and a fourth branch including a resistor unit adjustable to conform to the resistance of said third branch whereby to effect a balanced condition of said bridge arrangement, means responsive to the balanced condition of the bridge arrangement to produce an intentional unbalanced condition thereof and responsive to the intentional unbalanced condition of the bridge to restore the balanced condition thereof so long as no fault occurs on said control circuit, said temperature compensating resistor being subject to atmospheric temperature and having an electrical characteristic such that it compensates for changes in the control circuit resistance due to atmospheric temperature changes in a manner to prevent undesired unbalance of the bridge arrangement, and means responsive to the continued operation of the said means responsive to the balanced and unbalanced conditions of the bridge arrangement for indicating the integrity of the control circuit.

6. Apparatus for indicating the integrity or lack of integrity of an electric control circuit, said apparatus comprising a Wheatstone bridge arrangement having the control circuit to be checked as a branch thereof and having a resistor unit constituting another branch thereof, which resistor unit is adjustable to conform to the resistance of said control circuit so as to produce a balanced condition of said bridge arrangement, a circuit for applying an operating voltage to the supply terminals of said bridge arrangement, means effective automatically in accordance with the adjustment of said resistor unit for reducing the operating voltage applied to said bridge arrangement, means responsive to a balanced condition of the bridge arrangement to produce an intentional unbalanced condition thereof and responsive to the unbalanced condition to restore the balanced condition of the bridge arrangement so long as no fault exists on said control circuit, and means responsive to the continued operation of the last said means to repeatedly effect the successive balanced and unbalanced conditions of the said bridge arrangement for indicating the integrity of said control circuit.

7. Apparatus for indicating the integrity or lack of integrity of an electric control circuit, said apparatus comprising a Wheatstone bridge arrangement having the control circuit to be checked as a branch thereof and having a variable resistor unit constituting another branch thereof, which resistor is adjustable to conform to the resistance of said control circuit so as to produce a balanced condition of said bridge arrangement, a circuit for applying an operating voltage to the supply terminals of said bridge arrangement, a resistor in said circuit, a shunting switch effective automatically in response to adjustment of said adjustable resistor for unshunting said resistor to within a certain range to effect reduction of the voltage applied to said bridge arrangement, and effective over the remaining range of adjustment of the adjustable resistor to shunt the said resistor, means responsive to a balanced condition of the bridge arrangement to produce an intentional unbalanced condition thereof and responsive to the unbalanced condition to restore the balanced condition of the bridge arrangement so long as no fault exists on said control circuit, and means responsive to the continued operation of the last said means to repeatedly effect the balanced and unbalanced conditions of the said bridge arrangement for indicating the integrity of said control circuit.

8. Apparatus for checking and indicating the integrity of an electric control circuit, said apparatus comprising a Wheatstone bridge arrangement including the control circuit to be checked as a branch thereof and having as a second branch thereof a resistor unit capable of adjustment to conform to the resistance of said control circuit to balance the bridge arrangement, resistance changing means for alternately varying and restoring the resistance of first one and then the other of said branches so long as no fault occurs in said control circuit, an indicating means for indicating a balanced or unbalanced condition of the bridge arrangement when adjusting said resistor, a circuit for normally shunting said indicating means, switch means manually operable to prevent operation of said resistance changing means and for opening said shunting circuit when initially balancing said bridge arrangement, and means responsive to the continued operation of said resistance changing means for indicating the integrity of said control circuit.

9. For use in connection with an electric control circuit adapted to be energized and deenergized, apparatus for checking and signaling the integrity or lack of integrity of an electric circuit, and means effective upon deenergization of said electric control circuit for connecting said apparatus to said electric control circuit and effective upon energization of said control circuit to disconnect said apparatus from said control circuit.

10. For use with an electric control circuit of an electro-pneumatic brake equipment wherein the said control circuit is energized or deenergized for applying and releasing the brakes, apparatus operative to check and indicate the integrity or lack of integrity of an electric circuit, and means effective upon deenergization of the said control circuit to connect said apparatus to said control circuit and initiate operation of said apparatus to indicate the integrity or lack of integrity of said control circuit, and effective upon energization of said control circuit for disconnecting said apparatus from said control circuit and terminating operation thereof.

11. For use in connection with an electrically controlled brake control equipment having electric control circuits adapted to be energized or deenergized for controlling the brake release and the brake application, apparatus adapted to be connected to the electric control circuits of said brake equipment for checking and indicating the integrity or lack of integrity of said control circuits, and relay means operatively effective upon a brake release for connecting said apparatus to said control circuits and operatively effective upon initiation of a brake application for disconnecting said apparatus from said control circuits.

12. For use in connection with an electrically controlled brake control equipment having electric control circuits adapted to be energized or deenergized for controlling the brake operation, apparatus adapted to be connected to the electric control circuits of said brake equipment for checking and indicating the integrity or lack of integrity of said control circuits, relay means responsive to a brake release operation for connecting said apparatus to said control circuits and responsive to initiation of a brake application operation for disconnecting said apparatus from said control circuits, and means controlled by said relay means and operative when said relay means disconnects said apparatus from said control circuits for indicating a brake application.

13. For use in connection with an electro-pneumatic brake control system for a train of cars which brake system includes a plurality of control circuits extending from car to car throughout the train and being adapted to be selectively energized or deenergized for controlling the application and release of the brakes on the train, apparatus for checking the integrity of the control circuits of the brake system comprising a first relay adapted to be maintained in one position so long as the integrity of said control circuits is not impaired and operated to a second position upon impairment of the integrity of said circuits, a second relay, means for effecting actuation of said second relay to one position so long as the control circuits are deenergized and effective upon energization of said control circuits to cause said second relay to be operated to a second position, and three signal devices, one of which is energized under the joint control of the said first relay in its said one position and said second relay in its said one position to indicate the non-impairment of integrity of said control circuits, the second of which is energized under the joint control of said first relay in its said one position and said second relay in its said second position to indicate the energization of the control circuits, and the third of which is energized under the sole control of said first relay in its said second position to indicate the impairment of integrity of said control circuits.

14. For use in connection with an electro-pneumatic train brake control system including a plurality of control circuits extending from car to car throughout the train and adapted to be operatively energized or deenergized to control the application and release of the brakes, apparatus for signaling the integrity of the control circuits, said apparatus comprising means operative to provide a certain coded signal only so long as no fault on the control circuits exists, a tuned relay controlled responsively to the said certain coded signal and maintained in one certain position only so long as the said certain coded signal continues, a second relay, means controlling said second relay in a manner such that it is operative from one position to a second position instantly upon operative energization of at least one of the control circuits and restored to its said one position upon operative deenergization of said circuit, means providing a circuit for maintaining said tuned relay in its said one certain position upon movement of said second relay to its said second position, independently of continuance of the said certain coded signal, and two signal devices under the joint control of said tuned relay and said second relay, one of said signal devices being energized selectively under the control of said second relay while in its said one position to indicate the integrity condition of the control circuits, and the other of said signal devices being selectively energized under the control of said second relay in its said second position to indicate a brake applied condition of the brake system.

CLAUDE M. HINES.

REFERENCES CITED

The following references are of record in the file of this patent:

UNITED STATES PATENTS

| Number | Name | Date |
|---|---|---|
| 1,765,475 | White | June 24, 1930 |
| 2,052,190 | Miller et al. | Aug. 25, 1936 |
| 2,055,563 | Sorensen et al. | Sept. 29, 1936 |
| 2,091,007 | McCune | Aug. 24, 1937 |
| 2,276,706 | Sorensen | Mar. 17, 1942 |
| 2,478,000 | Miller | Aug. 2, 1949 |